United States Patent
Hu et al.

(10) Patent No.: US 12,504,723 B2
(45) Date of Patent: Dec. 23, 2025

(54) DYNAMIC PROPORTIONAL-INTEGRAL-DERIVATIVE (PID) METHOD FOR PLATE STRAIGHTENING BASED ON CHANGES IN YIELD STRENGTH

(71) Applicant: Taiyuan University of Science and Technology, Taiyuan (CN)

(72) Inventors: Ying Hu, Taiyuan (CN); Xiaogang Wang, Taiyuan (CN); Peng Hu, Taiyuan (CN)

(73) Assignee: Taiyuan University of Science and Technology (CN)

( * ) Notice: Subject to any disclaimer, the term of this patent is extended or adjusted under 35 U.S.C. 154(b) by 374 days.

(21) Appl. No.: 18/103,121

(22) Filed: Jan. 30, 2023

(65) Prior Publication Data
US 2024/0004352 A1    Jan. 4, 2024

(30) Foreign Application Priority Data
Jul. 1, 2022 (CN) .......................... 202210773324.3

(51) Int. Cl.
*G05B 11/42*     (2006.01)
*B21D 1/02*     (2006.01)

(52) U.S. Cl.
CPC .............. *G05B 11/42* (2013.01); *B21D 1/02* (2013.01)

(58) Field of Classification Search
CPC ................................. G05B 11/42; B21D 1/02
(Continued)

(56) References Cited

U.S. PATENT DOCUMENTS 5,586,221 A * 12/1996 Isik ...................... G05B 13/027
                                                               700/78
2009/0005886 A1* 1/2009 Gao ........................ G05B 13/02
                                                               700/29
(Continued)

FOREIGN PATENT DOCUMENTS

| CN | 106483845 A | 3/2017 |
|----|-------------|--------|
| CN | 109520840 A | 3/2019 |

(Continued)

OTHER PUBLICATIONS

Notice of Allowance issued in corresponding CN case, dated Jul. 4, 2025, with translation.
(Continued)

*Primary Examiner* — Md Azad
(74) *Attorney, Agent, or Firm* — Calderon Safran & Wright PC; Corinne Marie Pouliquen

(57) ABSTRACT

The invention provides a dynamic proportional-integral-derivative (PID) method for plate straightening based on changes in yield strength. The method includes the steps of determining yield strength of a plate at an initial temperature; calculating a predicted straightening force of each straightening roll based on the yield strength; obtaining a measured straightening force of each straightening roll; determining yield strength errors $\Delta\sigma_{front}$, $\Delta\sigma_{middle}$, and $\Delta\sigma_{rear}$ using a numerical approximation method; determining parameters of a PID controller based on the yield strength errors $\Delta\sigma_{front}$, $\Delta\sigma_{middle}$, and $\Delta\sigma_{rear}$; calculating a target reduction of a corresponding straightening roll based on the yield strength error $\Delta\sigma_{middle}$ and the yield strength at the initial temperature; and adjusting a measured reduction of the current straightening roll using the PID controller with the parameters determined based on the target reduction.

4 Claims, 2 Drawing Sheets

(58) Field of Classification Search
USPC .......................................................... 700/42
See application file for complete search history.

(56) References Cited

U.S. PATENT DOCUMENTS

| | | | | |
|---|---|---|---|---|
| 2009/0265021 A1* | 10/2009 | Dubay | ................... | G05B 13/04 |
| | | | | 700/33 |
| 2009/0319060 A1* | 12/2009 | Wojsznis | ............... | G05B 17/02 |
| | | | | 706/47 |
| 2020/0230677 A1* | 7/2020 | Hausmann | ............... | B21D 1/02 |
| 2021/0341895 A1* | 11/2021 | Havlena | ................. | G06N 3/006 |
| 2023/0173573 A1* | 6/2023 | Fujii | ....................... | B21C 51/00 |

FOREIGN PATENT DOCUMENTS

| | | |
|---|---|---|
| CN | 113877987 A | 1/2022 |
| CN | 114602998 A | 6/2022 |
| CN | 115138716 A | 10/2022 |
| EP | 4049770 A1 | 8/2022 |
| GB | 1445084 | 8/1976 |
| GB | 1509024 | 4/1978 |
| KR | 20140085207 | 7/2014 |
| WO | 2007060310 A1 | 5/2007 |

OTHER PUBLICATIONS

Zhao Dong, Wu Qingjun, The Straightening Scheme of Wide and Thick Plate Hot Straightener, China Heavy Equipment, May 2019, No. 2, pp. 10-11, with English abstract.
Office Action issued in corresponding GB case, dated May 19, 2023.

* cited by examiner

DYNAMIC PROPORTIONAL-INTEGRAL-DERIVATIVE (PID) METHOD FOR PLATE STRAIGHTENING BASED ON CHANGES IN YIELD STRENGTH

CROSS REFERENCE TO RELATED APPLICATION

This patent application claims the benefit and priority of Chinese Patent Application No. 202210773324.3, filed on Jul. 1, 2022, the disclosure of which is incorporated by reference herein in its entirety as part of the application.

FIELD OF THE INVENTION

The invention relates to the technical field of plate straightening, and in particular, to a dynamic proportional-integral-derivative (PID) method for plate straightening based on changes in yield strength.

BACKGROUND OF THE INVENTION

For high-temperature plates, heat loss caused by various reasons during processing, transportation, and cooling, the temperature of different parts of the plate will change, resulting in changes in key parameters of the plate such as yield strength, which leads to changes in straightening force. Generally, the straightening force is calculated by taking the plate as a whole and using a unified yield strength as the yield strength of the whole plate, so as to obtain the straightening setting process, and predict the key force-energy parameters such as the straightening force. However, the actual high temperature plate will have large temperature changes in the head and tail, surface, and edge of the plate, resulting in uneven temperature distribution across the whole plate. For these reasons, the yield strength of the plate is not a constant value, especially the head and tail of the plate such as a high temperature thin plate. In addition, the temperature of the plate will change greatly during straightening, which makes the yield strength of each part of the plate change greatly due to the temperature change. If the processing is carried out at the same temperature, the calculation error of the straightening process of the head and tail of the plate is often large, and the corresponding parts cannot be straightened well.

The calculation of straightening process parameters should be optimized for different parts of the plate. Different yield strength should be used to calculate the straightening process and straightening force. In addition, the changing position of the plate during the straightening should be considered. Considering the past, present and future trends of key parameter changes, which can make the adjustment of the plate straightening process more accurate and precise, would also help optimize the process.

SUMMARY OF THE INVENTION

Based on this, an objective of the invention is to provide a dynamic PID method for plate straightening based on changes in yield strength, which uses the PID method to dynamically adjust a straightening reduction of each straightening roll according to the changes of the yield strength during straightening.

In order to achieve the above objective, the invention provides the following technical solutions:

A dynamic PID method for plate straightening based on changes in yield strength, including:
determining yield strength of a plate at an initial temperature;
calculating a predicted straightening force of each straightening roll based on the yield strength at the initial temperature;
obtaining a measured straightening force of each straightening roll;
determining a yield strength error $\Delta\sigma_{front}$ using a numerical approximation method based on an error between a predicted straightening force and a measured straightening force of a previous straightening roll;
determining a yield strength error $\Delta\sigma_{middle}$ using the numerical approximation method based on an error between a predicted straightening force and a measured straightening force of a current straightening roll;
determining a yield strength error $\Delta\sigma_{rear}$ using the numerical approximation method based on an error between a predicted straightening force and a measured straightening force of a next straightening roll;
determining parameters of a PID controller based on the yield strength errors $\Delta\sigma_{front}$, $\Delta\sigma_{middle}$, and $\Delta\sigma_{rear}$;
calculating a target reduction of a corresponding straightening roll based on the yield strength error $\Delta\sigma_{middle}$ and the yield strength at the initial temperature; and
adjusting a measured reduction of the current straightening roll using the PID controller with the parameters determined based on the target reduction.

Optionally, a process of calculating a predicted straightening force of each straightening roll based on the yield strength at the initial temperature including:
calculating a reduction of each straightening roll based on the yield strength at the initial temperature;
calculating a variation of a ratio of curvature of each straightening roll based on the reduction;
calculating an elastic bending moment of each straightening roll based on the variation of the ratio of curvature; and
calculating the predicted straightening force of each straightening roller based on the elastic bending moment.

Optionally, the parameters of the PID controller may be determined based on the yield strength errors $\Delta\sigma_{front}$, $\Delta\sigma_{middle}$, and $\Delta\sigma_{rear}$:
the parameters of the PID controller are $D=\Delta\sigma_{front}/\sigma_0$, $P=\Delta\sigma_{middle}/\sigma_0$, and $I=\Delta\sigma_{rear}/\sigma_0$, where $\sigma_0$ represents the yield strength of the plate at the initial temperature.

Optionally, a process of calculating a target reduction of a corresponding straightening roll based on the yield strength error $\Delta\sigma_{middle}$ and the yield strength at the initial temperature including:
determining actual yield strength based on the yield strength error $\Delta\sigma_{middle}$ and the yield strength at the initial temperature; and
calculating a target reduction of the current straightening roll based on the actual yield strength.

According to the specific embodiments provided by the invention, the invention discloses the technical effects detailed herein.

According to the method of the invention, the changes of the actual yield strength of the straightened plate are observed according to the measured straightening force of each roll during straightening, and a PID controller is used to continuously reduce the error between the original yield strength and the actual yield strength. The reduction of each straightening roll is updated according to the actual yield strength found, and the PID method is used to dynamically adjust a straightening reduction of each straightening roll according to the changes of the yield strength during straightening.

BRIEF DESCRIPTION OF THE DRAWINGS

To describe the embodiments of the invention more clearly, the accompanying drawings are briefly introduced below. Obviously, the accompanying drawings described below are only some embodiments of the invention. Those of ordinary skill in the art may further obtain other embodiments based on these accompanying drawings without creative labor.

DETAILED DESCRIPTION OF THE PREFERRED EMBODIMENTS

The technical solutions of the embodiments of the invention are clearly and completely described below with reference to the accompanying drawings. The described embodiments are merely a representative example rather than a representation of all the embodiments of the invention. All other embodiments obtained by those of ordinary skill in the art based on the embodiments of the invention without creative efforts shall fall within the protection scope of the invention.

An objective of the invention is to provide a dynamic PID method for plate straightening based on changes in yield strength, which realizes the dynamic high-precision straightening by dynamically adjustment of the straightening process of each straightening roll according to the changes in yield strength.

To make the above-mentioned objective, features, and advantages of the invention clearer and more comprehensible, the invention will be further described in detail below in conjunction with the accompanying drawings and specific embodiments.

Figure 1:
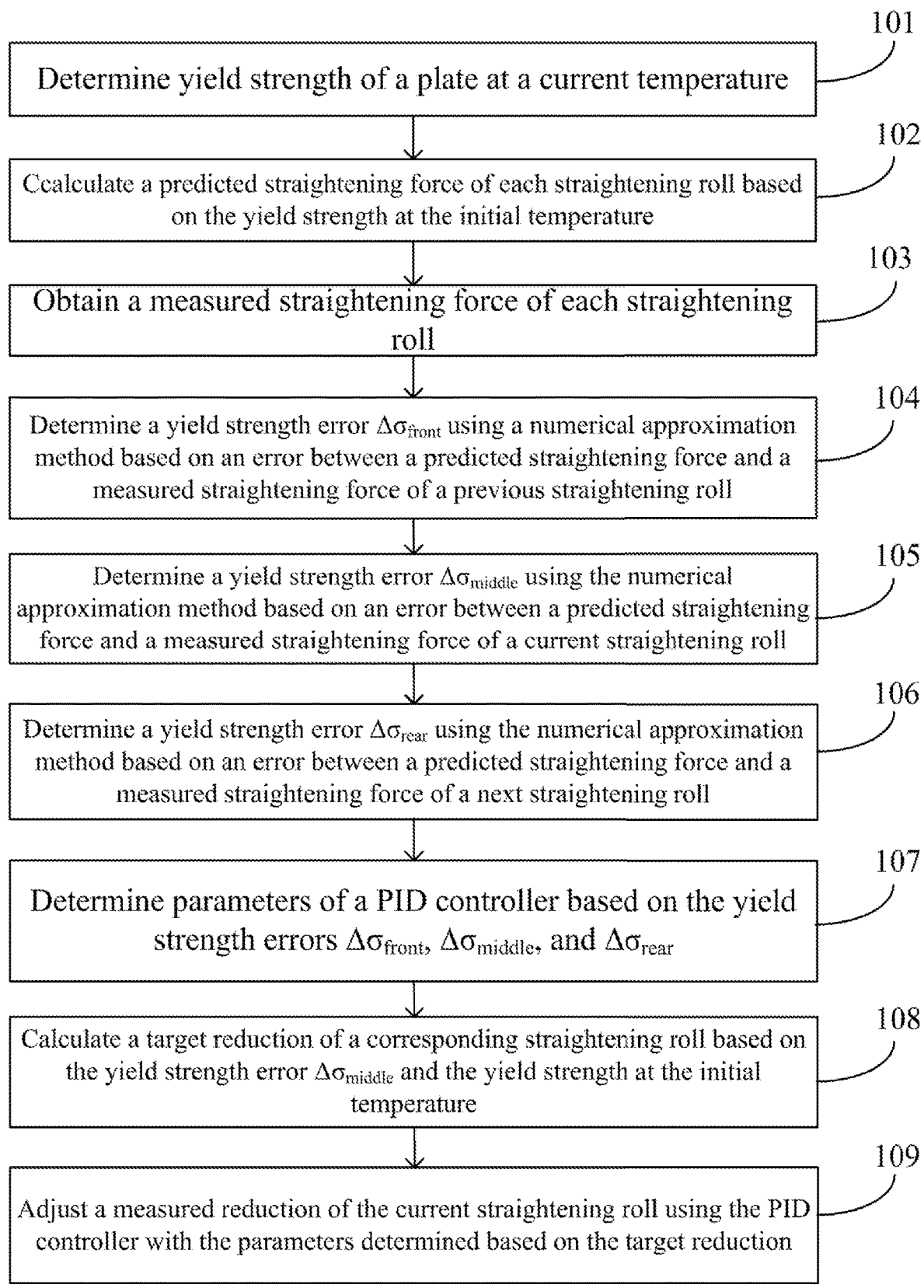
FIG. 1 is a flow chart of a dynamic PID method for plate straightening based on changes in yield strength provided by the invention.

As shown in FIG. 1, the dynamic PID method for plate straightening based on changes in yield strength provided by the invention includes the following steps. The method is implemented for operating a roll straightening machine 3 comprising a plurality of straightening rolls Ri composed of upper straightening rolls and lower straightening rolls, between which a plate to be straightened 1 is conveyed along a conveying direction in use.

Step 101: Yield strength of a plate at an initial temperature is determined.

The current temperature of the plate is transmitted back by a sensor, and the yield strength is determined in the knowledge base according to the temperature transmitted back.

Step 102: A predicted straightening force of each straightening roll is calculated based on the yield strength at the initial temperature.

(1) Calculation of Reduction

The plate is evenly divided into multiple sections, and in this embodiment, it is divided into 11 sections. Due to the uneven distribution of the plate caused by the temperature, the yield strength of each section is different. During straightening, a reduction of a first straightening roll is obtained by calculation based on the yield strength of the first section. During plate straightening, the reduction decreases linearly, and when it reaches the outlet roll, the reduction is a normal value. The reduction of the remaining straightening rolls is calculated based on a reduction of a second straightening roll.

An elastic limit curvature is:

$$\frac{1}{\rho_t} = \frac{2\sigma_s}{hE},$$

where $\rho_t$ represents an elastic limit curvature, $\sigma_s$ represents yield strength, h represents a plate thickness, and E represents an elastic modulus.

The reduction of the second straightening roll is calculated according to the formula:

$$S_2 = \frac{n*T*T}{12*\rho_t} = \frac{n*T*T}{12*\frac{h*E}{2*\sigma_s}} = \frac{n*T*T*\sigma_s}{6*h*E},$$

where T represents a roll distance. During the plate straightening, the reduction decreases linearly. When it reaches the outlet roll, the reduction is a normal value. The calculation formulas of the reduction of the remaining straightening rolls are as follows:

an upper roll system:

$$\frac{S_2 - S_i}{i - 2} = \frac{S_i - S_{N-1}}{(N-1) - i}$$

a lower roll system:

$$S_i = \frac{S_{i-1} + S_{i+1}}{2} (i = 3, 5, 7 \ldots N\text{-}2).$$

(2) Calculation of Variation of Ratio of Curvature $C_{\Sigma_i}$

A reverse curvature of the first straightening roll is calculated according to the reduction. The original curvature is calculated according to the straightening reverse curvature of the first roll. The variation of the ratio of curvature is calculated according to the original curvature. Calculation formulas are as follows.

A reverse curvature at an i-th straightening roll is:

$$\frac{1}{\rho_{w_i}} = \frac{12 S_i}{T^2},$$

where T represents a roll distance.

An original residual curvature at the i-th straightening roll is:

$$\frac{1}{\rho_{si}} = \begin{cases} 0 & i = 2 \\ \frac{1}{\rho_{w(i-1)}} - \frac{1}{\rho_t} & i > 2 \end{cases}.$$

A variation of a ratio of curvature of the second roll is:

$$c_{\Sigma_2} = \frac{\rho_t}{\rho_{w_2}} = \frac{h*E}{2\sigma_s} * \frac{12*S_2}{T*T} = \frac{6*S_2*h*E}{T*T*\sigma_s}.$$

Variations of ratios of curvature of the remaining straightening rolls are:

$$C_{\Sigma_i} = \frac{\rho_t}{\rho_{w_i}} - \frac{\rho_t}{\rho_{s_i}} = \frac{\frac{h*E}{2*\sigma_s}}{\frac{T*T}{12*S_i}} - \frac{h*E}{2*\sigma_s} * \left(\frac{1}{\rho_{w(i-1)}} - \frac{1}{\rho_t}\right)$$

$$= \frac{6*S_1*h*E}{T^2*\sigma_s} - \frac{h*E}{2\sigma_s} * \left(\frac{12*S_{i-1}}{T^2} - \frac{2*\sigma_s}{hE}\right) =$$

$$\frac{6*S_1*h*E}{T^2*\sigma_s} - \frac{6S_1*h*E}{\sigma_s*T^2} + 1$$

$$= \frac{6*h*E*(S_i - S_{i-1})}{T^2*\sigma_s} + 1$$

where $\rho_t$ represents an elastic limit curvature, $\sigma_s$ represents yield strength, h represents a plate thickness, E represents an elastic modulus, $S_i$ represents a reduction of the i-th straightening roll, and T represents a roll distance.

(3) Calculation of Elastic Bending Moment $M_i$

An elastic bending moment of the first roll is calculated according to the variation of the ratio of curvature. A calculation formula is as follows:

$$Mt = \frac{h^2 * w * \sigma_s}{6},$$

where $M_t$ represents a limit value of the elastic bending moment, w represents a plate width, h represents a plate thickness, and $\sigma_s$ represents yield strength.

$$M_i = Mt * \left(1.5 - \frac{0.5}{C_{\Sigma_i}^2}\right),$$

where $M_i$ represents the bending moment of the i-th roll, and $C_{\Sigma_i}$ represents the variation of the ratio of curvature of the i-th roll.

(4) Calculation of Predicted Straightening Force of Straightening Roll $$F_1 = \frac{2}{T}M_2,$$

$$F_2 = \frac{2}{T}(2M_2 + M_3),$$

$$F_3 = \frac{2}{T}(M_2 + 2M_3 + M_4),$$

$$F_4 = \frac{2}{T}(M_3 + 2M_4 + M_5),$$

$$F_{N-1} = \frac{2}{T}(2M_{N-1} + M_{N-2}), \text{ and}$$

$$F_N = \frac{2}{T}M_{N-1}$$

where $M_i$ represents the bending moment of the i-th straightening roll, and $F_i$ represents the predicted straightening force of the i-th straightening roll.

Step 103: A measured straightening force of each straightening roll is obtained.

Step 104: A yield strength error $\Delta\sigma_{front}$ is determined using a numerical approximation method based on an error between a predicted straightening force and a measured straightening force of a previous straightening roll.

Step 105: A yield strength error $\Delta\sigma_{middle}$ is determined using the numerical approximation method based on an error between a predicted straightening force and a measured straightening force of a current straightening roll.

Step 106: A yield strength error $\Delta\sigma_{rear}$ is determined using the numerical approximation method based on an error between a predicted straightening force and a measured straightening force of a next straightening roll.

The specific process of steps 104-106 is as follows.

The calculated predicted straightening force $F_i$ and the measured straightening force $F'_i$ are compared to obtain an error, $\Delta F = F'_i - F_i$. If $\Delta F > 0$, the measured straightening force is greater than the predicted straightening force, and the yield strength is greater than the original yield strength, and an adjustment needs to be made. According to the error, the inverse calculation is performed, and the yield strength is increased every 0.00001 MPa using the numerical approximation method. The yield strength is obtained after each adjustment. A straightening force is calculated and compared with the measured straightening force $F'_i$ until the error between the calculated straightening force, which is continuously adjusted according to the changes of yield strength, and the measured straightening force is less than 1%, so as to obtain the true yield strength $\sigma'$ and the predicted yield strength error $\Delta\sigma = \sigma' - \sigma$. If $\Delta F < 0$, the measured straightening force is less than the predicted straightening force, and the yield strength is less than the original yield strength. The yield strength is decreased every 0.00001 MPa using the numerical approximation method. The straightening force is calculated for each yield strength until the error between the predicted straightening force and the measured straightening force is less than 1%. The true yield strength $\sigma'$ and the error $\Delta\sigma$ are obtained.

Step 107: Parameters of a PID controller 2 are determined based on the yield strength errors $\Delta\sigma_{front}$, $\Delta\sigma_{middle}$, and $\Delta\sigma_{rear}$.

The roll straightening machine is set to have n rolls. It is assumed that the current roll is not the 1st roll and the Nth roll, there must be front and rear rolls for any roll. The parameters of the PID controller are determined based on the yield strength errors $\Delta\sigma_{front}$, $\Delta\sigma_{middle}$, and $\Delta\sigma_{rear}$: $D = \Delta\sigma_{front}/\sigma_0$, $P = \Delta\sigma_{middle}/\sigma_0$, and $I = \Delta\sigma_{rear}/\sigma_0$, where $\sigma_0$ represents the yield strength of the plate at the initial temperature.

Step 108: A target reduction of a corresponding straightening roll is calculated based on the yield strength error $\Delta\sigma_{middle}$ and the yield strength at the initial temperature. This step specifically includes: actual yield strength is determined based on the yield strength error $\Delta\sigma_{middle}$ and the yield strength at the initial temperature; and a target reduction of the current straightening roll is calculated based on the actual yield strength.

Step 109: A measured reduction of the current straightening roll is adjusted using the PID controller with the parameters determined based on the target reduction.

Figure 3:
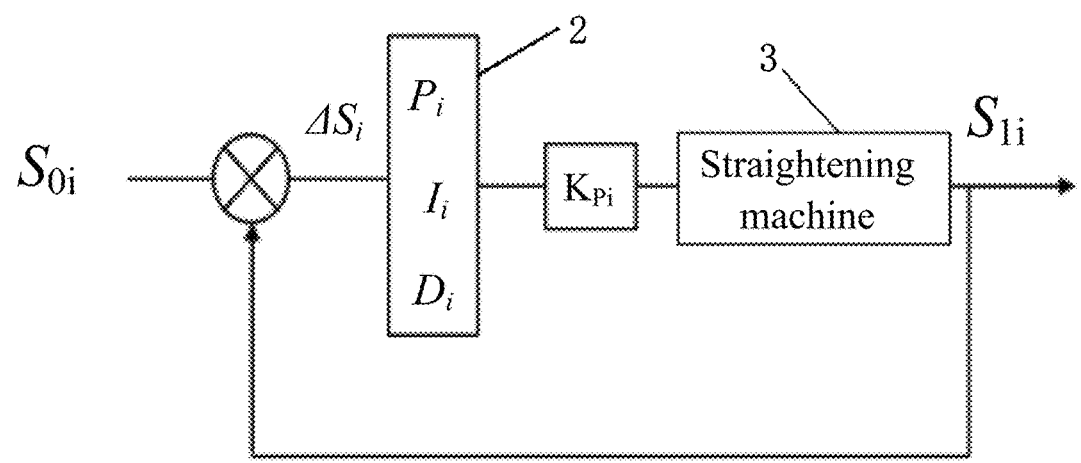
FIG. 3 is a schematic diagram of reduction adjustment by a PID controller provided by the invention.

As shown in FIG. 3, according to the constructed PID controller, the parameter $K_{P_i}$ is set. The current roll reduction is controlled with the default value=1, and the closed-loop control of the reduction is realized by dynamically adjusting the PID parameters according to the changes of the yield strength. The closed-loop control input is the target reduction $S_{0i}$, the output is the measured reduction $S_{1i}$, and the feedback error $\Delta S_i = S_{0i} - S_{1i}$.

Figure 2:
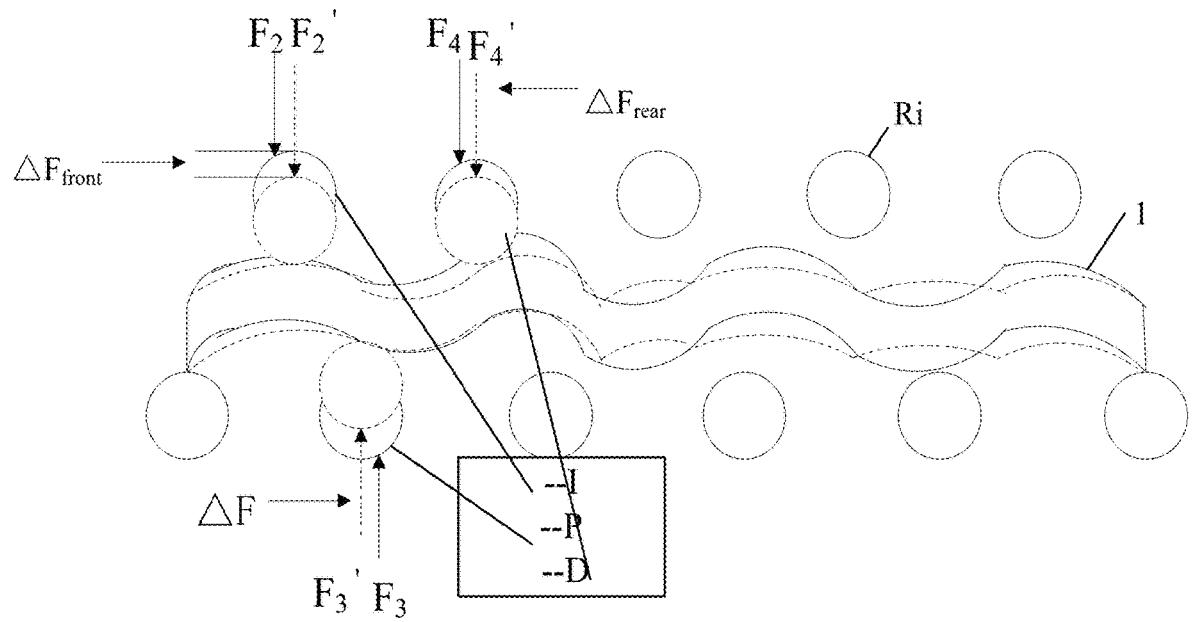
FIG. 2 is a process diagram of plate straightening provided by the invention.

Since there is no straightening force on the 1st roll and the nth roll, the default straightening force is equal to 0, and the variation of the straightening force is equal to 0. The above steps are repeated for the straightening rolls except the 1st roll and the nth roll until the plate straightening is completed. FIG. 2 is a process diagram of plate straightening provided by the invention. $F_2$, $F_3$, and $F_4$ is the predicted straightening force of the second, third, and fourth straightening rolls. $F_2'$, $F_3'$, and $F_4'$ is the measured straightening force of the second, third, and fourth straightening rolls. $\Delta F$ is an error between the predicted straightening force and the measured straightening force.

According to the method, the changes of the actual yield strength of the straightened plate are observed according to the measured straightening force of each roll during straightening, and the parameters of the PID controller are set according to the rate of change of the front, middle, and rear yield strength, thereby considering the current, past, and future changes of the yield strength on the straightening process. The reduction error caused by the error between the original yield strength and the actual yield strength is continuously reduced. The reduction process of each roll is updated according to the found yield strength, and the dynamic high-precision straightening is realized by dynamically adjusting the straightening process of each straightening roll according to the changes in yield strength.

Each embodiment describe herein is described in a progressive manner, each embodiment focuses on the difference from other embodiments, and the same and similar parts between the embodiments may refer to each other. Since the system disclosed in an embodiment corresponds to the method disclosed in another embodiment, the description is relatively simple, and reference can be made to the method description.

Specific examples are used herein to explain the principles and embodiments of the invention. The foregoing description of the embodiments is merely intended to help understand the method of the invention and its core ideas; besides, various modifications may be made by those of ordinary skill in the art to specific embodiments and the scope of application in accordance with the ideas of the invention. In conclusion, the content of the description shall not be construed as limitations to the invention.

What is claimed is:

1. A dynamic proportional-integral-derivative (PID) method for plate straightening based on changes in yield strength, comprising the steps of:
    determining yield strength of a plate to be straightened at a temperature currently detected;
    calculating a predicted straightening force of each of a plurality of straightening rolls based on the yield strength at the temperature;
    obtaining a measured straightening force of each of the plurality of straightening rolls;
    determining a yield strength error $\Delta\sigma_{front}$ using a numerical approximation method based on an error between a predicted straightening force and a measured straightening force of a previous straightening roll;
    determining a yield strength error $\Delta\sigma_{middle}$ using the numerical approximation method based on an error between a predicted straightening force and a measured straightening force of a current straightening roll;
    determining a yield strength error $\Delta\sigma_{rear}$ using the numerical approximation method based on an error between a predicted straightening force and a measured straightening force of a next straightening roll;
    determining parameters of a PID controller based on the yield strength errors $\Delta\sigma_{front}$, $\Delta\sigma_{middle}$, and $\Delta\sigma_{rear}$;
    calculating a target reduction of a corresponding straightening roll based on the yield strength error $\Delta\sigma_{middle}$ and the yield strength at the temperature;
    inputting the target reduction into the PID controller with the parameters determined, to output a measured reduction of the current straightening roll to a roll straightening machine comprising the plurality of straightening rolls; and
    moving the current straightening roll by the roll straightening machine according to the measured reduction of the current straightening roll, for straightening the plate to be straightened;
    wherein the step of calculating a predicted straightening force of each of the plurality of straightening rolls based on the yield strength at the temperature comprises:
        calculating a reduction of each of the plurality of straightening rolls based on the yield strength at the temperature;
        calculating a variation of a ratio of curvature of each of the plurality of straightening rolls based on the reduction;
        calculating an elastic bending moment of each of the plurality of straightening rolls based on the variation of the ratio of curvature; and
        calculating the predicted straightening force of each of the plurality of straightening rolls based on the elastic bending moment.

2. The dynamic PID method for plate straightening based on changes in yield strength according to claim 1, wherein the parameters of the PID controller are determined based on the yield strength errors $\Delta\sigma_{front}$, $\Delta\sigma_{middle}$, and $\Delta\sigma_{rear}$, and the parameters of the PID controller are $D=\Delta\sigma_{front}/\sigma_0$, $P=\Delta\sigma_{middle}/\sigma_0$, and $I=\Delta\sigma_{rear}/\sigma_0$, wherein $\sigma_0$ represents the yield strength of the plate at the initial temperature.

3. The dynamic PID method for plate straightening based on changes in yield strength according to claim 1, wherein the step of calculating a target reduction of a corresponding straightening roll based on the yield strength error $\Delta\sigma_{middle}$ and the yield strength at the temperature specifically comprises:
    determining actual yield strength based on the yield strength error $\Delta\sigma_{middle}$ and the yield strength at the temperature; and
    calculating a target reduction of the current straightening roll based on the actual yield strength.

4. The dynamic PID method for plate straightening based on changes in yield strength according to claim 1, wherein the plurality of straightening rolls are composed of upper straightening rolls and lower straightening rolls, between which the plate to be straightened is conveyed along a conveying direction in use.

* * * * *